United States Patent [19]

Tsuji

[11] Patent Number: 5,059,656

[45] Date of Patent: Oct. 22, 1991

[54] TWO-SOLUTION ACRYLIC ADHESIVE COMPOSITION

[75] Inventor: Hideoki Tsuji, Toyono, Japan

[73] Assignee: National Starch and Chemical Investment Holding Corporation, Wilmington, Del.

[21] Appl. No.: 458,030

[22] Filed: Dec. 28, 1989

[30] Foreign Application Priority Data

Dec. 29, 1988 [JP] Japan ................................. 63-331016

[51] Int. Cl.$^5$ ........................ C08L 23/24; C08L 9/02; C08L 23/26; C08L 51/04
[52] U.S. Cl. ................................... 525/155; 525/193; 525/192; 525/233; 525/939; 524/906
[58] Field of Search ................. 525/155, 939; 524/906

[56] References Cited

U.S. PATENT DOCUMENTS

| | | | |
|---|---|---|---|
| 3,890,407 | 6/1975 | Briggs, Jr. et al. | 260/878 R |
| 4,106,971 | 8/1978 | Briggs, Jr. et al. | 156/310 |
| 4,112,013 | 9/1978 | Briggs et al. | 260/878 R |
| 4,182,644 | 1/1980 | Briggs et al. | 156/310 |
| 4,200,480 | 4/1980 | Wolinski et al. | 156/294 |
| 4,942,201 | 7/1990 | Briggs et al. | 525/71 |

*Primary Examiner*—Carman J. Seccuro
*Attorney, Agent, or Firm*—Edwin M. Szala

[57] ABSTRACT

The two-solution acrylic adhesive composition of this invention is composed of a solution A which has as its necessary ingredients (1) a chlorosulfonated polyethylene, (2) a (meth)acrylate monomer, and (3) an organic peroxide, and a solution B which has as its necessary ingredients (4) a butadiene-acrylonitrile copolymer elastomer (NBR), (5) a (meth)acrylate monomer, and (6) an aminealdehyde condensate.

5 Claims, No Drawings

TWO-SOLUTION ACRYLIC ADHESIVE COMPOSITION

BACKGROUND OF THE INVENTION

The two-solution arcylic adhesive composition of this invention is composed of a solution A which has as its necessary ingredients (1) a chlorosulfonated polyethylene, (2) a (meth)acrylate monomer, and (3) an organic peroxide, and a solution B which has as its necessary ingredients (4) a butadiene-acrylonitrile copolymer elastomer (NBR), (5) a (meth)acrylate monomer, and (6) an aminealdehyde condensate.

Two-solution acrylic adhesives, characterized by containing various elastomer ingredients dissolved in reactive acrylic monomers and cured with redox catalysts, have been widely used for some time. Examples of such two-solution acrylic adhesives are those shown in Japanese Public Patent Disclosure Bulletins Nos. 49-132119, 51-7040, and 55-129740. As can be seen in these examples, the general method of bonding two objects together is that a (meth)acrylate solution containing a chlorosulfonated polyethylene and a polymerization initiator (main adhesive) is applied to one of the objects and a curing accelerator such as an amine-aldehyde condensate is applied to the other one; the two surfaces to which these solutions have been applied are then put into contact with each other. In this type of adhesive, since the acrylic monomer is graft-polymerized onto the chlorosulfonated polyethylene in the curing process, advantages are obtained in that the shrinkage rate is comparatively small, and there is excellent heat resistance. On the other hand, however, since a large quantity of chlorine is present in the chlorosulfonated polyethylene structure, there is the problem that when the adhesive is used on metal surfaces, and the parts to which the adhesive was applied are left under a high temperature for a long period, the aforementioned chlorine is eliminated and corrodes the metal surfaces. Moreover, there is the problem that, since the viscosities of curing accelerators containing amine-aldehyde condensates, etc., are low, the curing accelerator penetrates into the surface to which the adhesive is applied when the objects to which the adhesive is to be applied have porous surfaces, such as wood or foams. After the surfaces are adhered together the adhesive strength is uneven; moreover, since the quantity of curing accelerator used is very small, it is difficult to control the correct quantity that must be applied.

Therefore, it has been proposed that the curing accelerator solution be thickened with an acrylic resin (Japanese Public Patent Disclosure Bulletin No. 61-51072), or an epichlorohydrin rubber (Japanese Public Patent Disclosure Bulletin No. 56-74165).

However, the aforementioned acrylic rubbers have poor solubilities in (meth)acrylate monomers, and if the quantity compounded is increased, a gel is formed and uniform mixing is prevented. Moreover, the strength of the adhered layers after the two solutions are mixed and cured is still insufficient.

Acrylic resins have good solubilities in (meth)acrylate monomers, but it is necessary to compound a large quantity of such resins in order to obtain the target viscosity, and the rubber elasticity of the adhered layers which is obtained when a large quantity of the resin is compounded is lost, which is not desirable. Moreover, the spinnability of these resins is strong, which presents a problem of workability.

Epichlorohydrin rubber, in addition to having the same problems as aforementioned acrylic rubber, has a large quantity of chlorine in its molecule, like the chlorosulfonated polyethylene, and when it is exposed to high temperatures for long periods, the free chlorine corrodes the adhesion interface.

This invention was made with this situation in view, and has the purpose of providing a two-solution acrylic adhesive composition with excellent resistance to thermal deterioration and excellent workability.

SUMMARY OF THE INVENTION

In order to accomplish this purpose, the two-solution acrylic adhesive composition of this invention consists of solution A, in which the following ingredients (1)-(3) are dissolved and mixed as necessary ingredients, in the proportions mentioned below, and a solution B, in which the following ingredients (4)-(6) are dissolved and mixed as necessary ingredients, in the proportions mentioned below:

| Solution A | | |
|---|---|---|
| (1) Chlorosulfonated polyethylene | 12.5–35 wt % |
| (2) At least one (meth)acrylate selected from a group consisting of (meth)acrylic acid, (meth)acrylate, di(meth)acrylate, and (meth)acrylate with hydroxyl, glycidyl, or amino groups | 50–85 wt % |
| (3) Organic peroxide | 0.2–10 wt % |
| Solution B | | |
| (4) Butadiene-acrylonitrile copolymer elastomer | 10–25 wt % |
| (5) At least one (meth)acrylate selected from a group consisting of (meth)acrylic acid, (meth)acrylate, di(meth)acrylate, and (meth)acrylate with hydroxyl, glycidyl, or amino groups | 40–90 wt % |
| (6) Curing accelerator consisting of an amine-aldehyde condensate | 1–20 wt % |

DETAILED DESCRIPTION OF THE PREFERRED EMBODIMENTS

The inventors performed a series of studies with the purpose of improving the workability and thermal deterioration resistance of two-solution acrylic adhesive compositions containing chlorosulfonated polyethylenes in the main adhesive. As a result, they discovered that if butadiene-acrylonitrile copolymer elastomers (NBR) are used to regulate the viscosity of solution B, and the proportions of the various necessary ingredients of solutions A and B are limited as mentioned above, the desired purpose can be accomplished. They also discovered that if specific styrene block copolymers are included in at least one of the aforementioned solutions A and B, the spinnability during application, which was a problem previously, is improved, in addition to the aforementioned effects.

The two-solution acrylic adhesive composition of this invention is composed of a solution A which has as its necessary ingredients (1) a chlorosulfonated polyethylene, (2) a (meth)acrylate monomer, and (3) an organic peroxide, and a solution B which has as its necessary ingredients (4) an NBR, (5) a (meth)acrylate monomer, and (6) an amine-aldehyde condensate.

As the chlorosulfonated polyethylene (1), one can use any one, but those with chlorine contents of 20–45% and Mooney viscosities (ML 1+4, 100° C.) of about 20-100 are especially suitable. As commercial products of this kind, Hypalon ® (made by duPont de Nemours & Co.), etc., are known. The content of the chlorosulfonated polyethylene in solution A must be 12.5-35 wt % (abbreviated hereafter and below as "%"); a range of 20-30% is especially suitable. If the quantity of chlorosulfonated polyethylene is less than 12.5%, it is difficult to obtain a practical adhesive strength, and if it is greater than 35%, the viscosity of solution A becomes too high, and its miscibility with solution B becomes poor.

As the (meth) acrylate monomer (2) one can use any of the following: (meth)acrylic acid, ethyl (meth)acrylate, propyl (meth)acrylate, butyl (meth)acrylate, isobutyl (meth)acrylate, 2-ethylhexyl (meth)acrylate, isodecyl (meth)acrylate, lauryl (meth)acrylate, stearyl (meth)acrylate, alkyl(meth)acrylates of $C_{10}$-$C_{18}$, cyclohexyl (meth)acrylate, isobornyl (meth)acrylate, 2-hydroxyethyl (meth)acrylate, 2-hydroxypropyl (meth)acrylate, dimethylaminoethyl (meth)acrylate, dimethylaminoethyl (meth)acrylate, diethylaminoethyl (meth)acrylate, ethylene glycol dimethacrylate, diethylene glycol dimethacrylate, tetraethylene glycol dimethacrylate, trimethylol propane trimethacrylate, 1,6-hexanedioldimethacrylate, 2-methacryloyloxyethyl succinate, 2-methacryloyloxyethyl phthalate, glycidyl methacrylate, dimethylaminomethyl methacrylate, mono(2-methacryloyloxyethyl)acid phosphate, mono(2-acryloyloxyethyl)acid phosphate, tetrahydrofurfuyl methacrylate, n-butoxyethyl methacrylate, methylsorbitol methacrylate, methyltriglycol methacrylate, butanediol dimethacrylate, neopentylglycol dimethacrylate, epoxy (meth)acrylates which are adducts of epoxy compounds and (meth)acrylic acid, urethane poly(meth)acrylates, cyanoacrylates, etc. These compounds may be used individually or in combinations of two or more. The content of the monomer must be in the range of 50-85%. If the monomer content is less than 50%, the viscosity of the solution will become too high, and the application workability will be poor; if, on the contrary, it is greater than 85%, the viscosity will become too low and the application workability will also be poor, as well as the proportion of the rubber ingredient becoming too low, so that a cured product with rubber elasticity is not obtained.

Other monomers besides the aforementioned (meth)acrylate monomers, such as styrene, acrylonitrile, vinyl acetate, vinyl versatate, or other vinyl ester monomers can be added in suitable quantities, depending on the kind of objects to which the adhesive is to be applied. However, the quantity of such monomers added is limited to 20% or less of solution A. That is, if the quantity is greater than 20%, the adhesive properties of the adhesive composition will be limited, and it will not be widely used, or a separation phenomenon will be produced in solution A during storage in the tube.

As the organic peroxide (3) in solution A, one can use tertiary butyl peroxide, cumene hydroperoxide, diisopropylbenzene hydroperoxide, di-tertiarybutyl peroxide, tertiary butyl cumyl peroxide, methylethylketone peroxide, benzoyl peroxide, etc. These compounds can be used individually or in combinations of two or more. These organic peroxides must be contained in solution A in a range of 0.2-10%; a range of 0.5-5% is especially suitable.

The NBR (4) which is a necessary ingredient of solution B is selected especially for this invention, so that its miscibility with the (meth)acrylate solution of chlorosulfonated polyethylene is good, and it does not markedly change the properties of the adhesive, such as adhesive strength, adhesive heat resistance, and curing rate, even when it is used together with the chlorosulfonated polyethylene in large quantities. The nitrile content of such NBR should be 18-45%. Moreover, NBR containing carboxyl, amino and vinyl groups in their molecules may also be used. Furthermore, if a hydrogenated NBR is used, an adhesive with still greater resistance to thermal deterioration will be obtained. The content of the aforementioned NBR in solution B must be 10-25%; a range of 12.5-20% is still more desirable. If it is less than 10%, the viscosity of solution B will be reduced, and if it is greater than 25%, the viscosity of solution B will be increased; in either case, the workability will be poor.

The (meth)acrylate monomer (5) of solution B may be any of the (meth)acrylate monomers (2) in solution A mentioned above and must be present in the range of 40-90%.

As the curing accelerator (6) composed of an amine-aldehyde condensate which is a necessary ingredient of solution B, one can use, for example, a condensate of a butyl aldehyde and an aniline or butylamine; ordinarily, one uses the commercial products Accelerator 808, Accelerator 833 (both made by E. I. du Pont de Nemours & Co.), Nokusera 8 (Ouchi Shinko Kagaku Kogyo Co.), etc. The content of the aforementioned curing accelerator must be 1-20% of solution B; a range of 2-15% is especially desirable. If the aforementioned curing accelerator is less than 1%, the curing when the two solutions are mixed will be slow, and sufficient adhesive strength cannot be obtained. Coversely, if it is greater than 20%, the excess portion of the curing accelerator acts as a plasticizer, and the adhesive strength is reduced. Moreover, since the viscosity of the whole solution N is reduced, its uniform miscibility with solution A becomes worse.

When solutions A and B are prepared by using the aforementioned necessary ingredients, it is desirable to make the monomer ingredients of solutions A and B as close to each other as possible. For the degree of closeness of the aforementioned monomer ingredients, the difference in the secondary transition temperatures Tg of the monomer copolymers of the two solutions can be used as a criterion; it has been found that this difference should be within 80° C., especially 65° C. The secondary transition temperature of the aforementioned monomer copolymers can be easily obtained from the following formula of Fox:

$$\frac{1}{T_g} = \frac{w_1}{T_{g1}} + \frac{w_2}{T_{g2}} + \ldots + \frac{w_n}{T_{gn}}$$

where $W_1, W_2, \ldots W_n$ are the weight fractions of each monomer and $T_{g1}, T_{g2}, \ldots T_{gn}$ are the secondary transition temperatures of the various monomer single polymers.

Moreover, the viscosities of the two solutions should be made close to each other by having solution A as well as solution B contain the elastomer NBR. That is, by having solution A contain NBR in the range of 15% or less, so that the ratio of the elastomer ingredient content $W_a$ of solution A and the elastomer ingredient content of $W_b$ of solution N ($W_a/W_b$) is made 0.5-3.0 by weight, an adhesive layer with excellent adhesive strength is obtained when a two-solution separate type adhesive is applied. Furthermore, the aforementioned elastomer ingredient is chlorosulfonated polyethylene, NBR, or other elastomeric substances.

The two-solution acrylic adhesive composition obtained in this manner may be applied by applying solutions A and B separately, and making the two surfaces on which they are applied adhere, as with conventional two-solution acrylic adhesives. It is desirable, however, for the two solutions to be mixed before they are used, insofar as is possible. If this is done, there is no need to consider the balance of the two solutions as carefully, and not only will the application workability be good, but an adhesive layer can be formed which will have a high resistance to thermal deterioration, which could not be obtained previously. This appears to be because the NBR used as a necessary ingredient does not have chlorine in its molecular structure.

Furthermore, the inventors discovered that if a styrene block copolymer is added to either solution A or solution B of the two-solution acrylic adhesive composition of this invention, or to both solutions, the spinnability when the adhesive is applied, which was a problem previously, is improved. For the aforementioned styrene block copolymer, one can use, for example, styrene-butadiene-styrene block copolymers, styrene-isoprene-styrene block copolymers, styrene-ethylene-butylene-styrene block copolymers, styrene-ethylene-propylene-styrene block copolymers, styrene-butadiene block copolymers, styrene-isoprene block copolymers, styrene-ethylene-butylene block copolymers, or styrene-ethylene-propylene block copolymers. Especially desirable are styrene-ethylene-butylene-styrene block copolymers and styrene-ethylene-propylene-block copolymers. These may be used individually or in combinations of two or more. Furthermore, commercial products of such styrene block copolymers are Cariflex ® and Kraton ® both made by Shell Kagaku Co. The quantity of the aforementioned styrene block copolymer used should be 5–200%, preferably 10–140%, with respect to the elastomer ingredient. If the quantity added is less than 5%, the curing which improves the spinnability will be small, and if it is greater than 200%, the viscosity and thixotropy of the solution to which it is added will become too high.

Besides the aforementioned ingredients of the two-solution acrylic adhesive composition of this invention, one can also add, if desired, suitable quantities of coloring agents, paraffin, filler, anti-oxidants, epoxy resins or other chlorine trappers, cobalt naphthenate, copper naphthenate, magnesium naphthenate, or other metal soaps, or curing accelerators such as dimethyl-$p$-toluidine, diethanol-$p$-toluidine, diisopropanol-$p$-toluidine, thiourea, ethylene urea, acetylthiourea, tetramethyl thiourea, dibutyl thiourea, mercaptobenzimidazole, etc.

As mentioned above, the two-solution acrylic adhesive composition of this invention has good workability, since it may be used in the two-solution separate form, as with conventional adhesives, or applied after the two-solutions are mixed. Furthermore, the resultant adhesive layer has excellent thermal deterioration resistance; even when it is used in adhering metals, corrosion of the adhered surfaces is suppressed, and it is possible to preserve good adhesion over long periods. Consequently, the two-solution acrylic adhesive composition of this invention can be used in a wide range of applications, including not only the adhesion of construction panels, bathroom basins, solar panels, automobile door panels, etc., but also the adhesion of electrical machinery parts requiring heat resistance and thermal deterioration resistance, such as speaker and motor magnets, etc.

First, before the actual examples, 15 solutions A were prepared, as shown in Table 1 below, and 15 solutions B were prepared, as shown in Table 2 below. The viscosities of the solutions were investigated, and their states of composition were observed by the naked eye. These results are shown in Tables 1 and 2.

TABLE 1

|  | A1 | A2 | A3 | A4 | A5 | A6 | A7 | A8 | A9 | A10 | A11 | A12 | A13 | A14 | A15 |
|---|---|---|---|---|---|---|---|---|---|---|---|---|---|---|---|
| COMPOSITION |  |  |  |  |  |  |  |  |  |  |  |  |  |  |  |
| Hypalon | 35 | 30 | 25 | 20 | 12.5 | 40 | 10 | 20 | 15 | 20 | 20 | 20 | 20 | 20 | 20 |
| NBR |  |  |  |  |  |  |  |  |  |  |  |  |  |  |  |
| c | — | — | — | — | — | — | — | 5 | — | — | — | — | — | — | — |
| c | — | — | — | — | — | — | — | — | 15 | — | — | — | — | — | — |
| c | — | — | — | — | — | — | — | — | — | — | 5 | — | — | — | — |
| d | — | — | — | — | — | — | — | — | — | — | — | 5 | — | — | — |
| d | — | — | — | — | — | — | — | — | — | — | — | — | 5 | — | — |
| e | — | — | — | — | — | — | — | — | — | — | — | — | — | — | — |
| f | — | — | — | — | — | — | — | — | — | — | — | — | — | 5 | — |
| g Gechron CR-2000 | — | — | — | — | — | — | — | — | — | — | — | — | — | — | 5 |
| h | 32.5 | 57.3 | 62.0 | 52.5 | 59.0 | 38.0 | 77.0 | 62.0 | 37.0 | 32.5 | 62.0 | 62.0 | 62.0 | 62.0 | 62.0 |
| i | — | — | — | — | 15 | — | — | — | — | — | — | — | — | — | — |
| j | 10 | 5 | 10 | — | 5 | 5 | 10 | 10 | 10 | — | 10 | — | 10 | 10 | 10 |
| k | 10 | 5 | — | 10 | 5 | — | — | — | 20 | 30 | — | 10 | — | — | — |
| l | 2 | 2 | 2 | 2 | 2 | 2 | 2 | 2 | 2 | 2 | 2 | 2 | 2 | 2 | 2 |
| m | 10 | 0.2 | 0.5 | 5 | 1 | 15 | 0.5 | 0.5 | 0.5 | 10 | 0.5 | 0.5 | 0.5 | 0.5 | 0.5 |
| n | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| o (cps/25° C.) | 40000 | 15000 | 4000 | 2000 | 500 | 90000 | 180 | 12600 | 18000 | 13000 | 12000 | 15000 | 10000 | 45000 | 1500 |
| p | q | q | q | q | q | r | q | q | q | q | q | q | s | r | q | c. Niporu
d. Zettoporu
e. Acrylic resin Hararoido A-30
f. Acrylic rubber Haika 4051 EP
g. Epichlorohydrin rubber
h. Methyl methacrylate
i. Isobutyl methacrylate
j. Methacrylic acid
k. Hydroxyethyl methacrylate
l. Ethylene glycol dimethyacrylate
m. Cumene hydroperoxide
n. 2,5-di-tertiary-butyl-hydroquinone
o. Viscosity
p. Composition stability
q. Good
r. Gelled
s. Separated

TABLE 2

| a COMPOSITION | B1 | B2 | B3 | B4 | B5 | B6 | B7 | B8 | B9 | B10 | B11 | B12 | B13 | B14 | B15 |
|---|---|---|---|---|---|---|---|---|---|---|---|---|---|---|---|
| b NBR | 25 | 20 | 17.5 | 10 | 10 | 30 | 5 | 17.5 | 10 | — | — | — | — | — | — |
| b | — | — | — | 2.5 | — | — | — | — | 5 | 15 | — | — | — | — | — |
| b | — | — | — | — | — | — | — | — | — | — | 10 | — | — | — | — |
| c | — | — | — | — | — | — | — | — | — | — | — | 15 | — | — | — |
| d | — | — | — | — | — | — | — | — | — | — | — | — | 15 | — | — |
| e | — | — | — | — | — | — | — | — | — | — | — | — | — | 10 | — |
| f Gechron CR-2000 | — | — | — | — | — | — | — | — | — | — | — | — | — | — | 15 |
| g | 40 | 50 | 72.5 | 83 | 86.5 | 52.5 | 92 | 55 | 72.5 | 45 | 80 | 65 | 75 | 80 | 75 |
| h | 12.5 | — | — | — | — | — | — | — | — | 20 | — | — | — | — | — |
| i | — | 12.5 | — | — | — | — | — | — | — | — | — | — | — | — | — |
| j | — | — | — | — | — | — | — | — | — | 10 | — | 10 | — | — | — |
| k | 2 | 2 | 2 | 2 | 2 | 2 | 2 | 2 | 2 | 2 | 2 | 2 | 2 | 2 | 2 |
| l | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| m | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 |
| n | 20 | 15 | 7.5 | 2 | 1 | 15 | 0.5 | 25 | 10 | 7.5 | 7.5 | 7.5 | 7.5 | 7.5 | 7.5 |
| o | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| p (cps/25° C.) | 28000 | 9000 | 4000 | 2000 | 800 | 710 | 75 | 2500 | 4500 | 5000 | 2200 | 7500 | 5400 | 710 | 13000 |
| r | s | s | s | s | s | t | u | s | s | s | s | s | v | t | s | a. Composition
b. Niporu
c. Zettoporu
d. Acrylic resin Hararoido A-30
e. Acrylic rubber Haika 4051 EP
f. Epichlorohydrin rubber
g. Methyl methacrylate
h. Isobutyl methacrylate
i. Butyl acrylate
j. Hydroxyethyl methacrylate
k. Ethylene glycol dimethacrylate
l. 2,5-di-tertiary-butyl-hydroquinone
m. Copper naphthenate
n. Butylaldehyde-aniline condensate Nokusera-8
o. Oil blue
p. Viscosity
q. X 10,000
r. Composition stability
s. Good
t. Gelled
u. Low viscosity
v. Spinnable Actual Examples 1–10 and Comparison Examples 1–5

The 15 kinds of solution A shown in Table 1 and the solution B shown as B3 in Table 2 were mixed rapidly in equal quantities by weight, and the workabilities of mixing with solution B and applying were observed, after which the adhesives were used to adhere resins to each other and sanded spec copper plates to each other. Moreover, after standing at room temperature for 1 day, the tensile shear strengths of the adhesive bonds were measured, (measurement temperature: 20° C., pulling speed: 3 mm/min).

Furthermore, these adhered bodies were left for 2 months at 120° C., after which the temperature was returned to 20° C. and the tensile shear strengths were measured. These results are shown in Table 3 below.

position, miscibility with solution B and appliability, adhesive strength, and resistance to thermal deterioration.

Actual Examples 11–19 and Comparison Examples 6–11

The 15 kinds of solution B shown in Table 2 and the solution A shown as A3 in Table 1 were mixed rapidly in equal quantities by weight, and the workabilities of mixing with solution A and applying were observed, after which these adhesives were used to adhere resins to each other and sanded spec copper plates to each other. Moreover, after standing at room temperature for 1 day, the tensile shear strengths of the adhesive bonds were measured (measurement temperature: 20° C., pulling speed: 3 mm/min).

TABLE 3

| | | a | | | | b | | a | | | | | b | | |
|---|---|---|---|---|---|---|---|---|---|---|---|---|---|---|---|
| | 1 | 2 | 3 | 4 | 5 | 1 | 2 | 6 | 7 | 8 | 9 | 10 | 3 | 4 | 5 |
| d (kg/cm²) c | ○ | ○ | ○ | ○ | ○ | X | X | ○ | ○ | ○ | ○ | ○ | ○ | X | ○ |
| e | 235 | 228 | 217 | 210 | 168 | — | 135 | 215 | 182 | 211 | 209 | 206 | 228 | — | 210 |
| f | 215 | 216 | 219 | 213 | 177 | — | 150 | 221 | 200 | 208 | 210 | 203 | 206 | — | 165 | a. Actual Examples
b. Comparison Examples
c. Stability of mixture with B3
d. Tensile shear strength
e. After standing for 1 day
f. After 2 months at 120° C.

From these results, it can be seen that the actual examples in which solutions A with a chlorosulfonated polyethylene content of 12.5–35% were used, or the actual examples in which some of solution A was replaced with nitrile rubber, had excellent states of com- Furthemore, these adhered bodies were left for 2 months at 120° C., after which the temperature was returned to 20° C. and the tensile shear strengths were measured. These results are shown in Table 4 below.

TABLE 4

| | | a | | | | | b | | | a | | | | b | | |
|---|---|---|---|---|---|---|---|---|---|---|---|---|---|---|---|---|
| | 11 | 12 | 13 | 14 | 15 | 6 | 7 | 8 | 16 | 17 | 18 | 19 | 9 | 10 | 11 |
| d (kg/cm²) c | ○ | ○ | ○ | ○ | ○ | X | X | ○ | ○ | ○ | ○ | ○ | ○ | X | ○ |
| e | 180 | 193 | 217 | 225 | 185 | — | 87 | 98 | 220 | 181 | 230 | 216 | 240 | 98 | 210 |
| f | 195 | 197 | 219 | 216 | 164 | — | 126 | 101 | 229 | 186 | 232 | 217 | 185 | 120 | 113 | a. Actual Examples
b. Comparison Examples
d. Tensile shear strength
e. After standing for 1 day TABLE 4-continued c. Stability of mixture with A3   f. After 2 months at 120° C.

From these results, it can be seen that the actual examples in which solutions B with an NBR content of 10–25% and butylaldehyde-aniline condensate contents of 1–20% were used had excellent states of composition, miscibility with solution A and appliability, adhesive strength, and resistance to thermal deterioration.

Actual Examples 20–25 and Comparison Examples 12, 13

Using the combinations of solutions A and B shown in Table 5 below, adhesion of resins to each other and sanded spec copper plates to each other was performed. Moreover, the case in which solutions A and B were used unmixed (solution A applied to one of the objects and solution A and an equal quantity of solution B applied to the other object, after which the surfaces to which they were applied were stuck together) and the case in which they were used after being mixed (equal weights of solutions A and B mixed for 30 seconds, and the whole solution confirmed to have a uniform green color, after which the adhesion was performed rapidly) were used in the measurement of the tensile shear adhesion force. The measurements were performed with a number n=5 for adhered objects under the same conditions. These results are shown in Table 5 below.

TABLE 5

|   | a | | | | | | b | |
|---|---|---|---|---|---|---|---|---|
|   | 20 | 21 | 22 | 23 | 24 | 25 | 12 | 13 |
| c | A2 | A4 | A3 | A3 | A4 | A5 | A7 | A7 |
| d | 30 | 20 | 25 | 25 | 20 | 12.5 | 35 | 10 |
| e | B11 | B11 | B9 | B12 | B2 | B1 | B5 | B1 |
| f | 10 | 10 | 15 | 15 | 20 | 25 | 10 | 25 |
| $W_a/W_b$ | 3.0 | 2.0 | 1.7 | 1.7 | 1.0 | 0.5 | 3.5 | 0.4 |
| g (kg/cm$^2$) | | | | | | | | |
| h | 173 | 185 | 178 | 177 | 165 | 155 | 154 | 89 |
| i | 205 | 202 | 196 | 200 | 187 | 169 | 219 | 113 |
| j | 149 | 169 | 165 | 160 | 151 | 130 | 93 | 47 |
| k (kg/cm$^2$) | | | | | | | | |
| h | 231 | 236 | 220 | 216 | 198 | 179 | 230 | 176 |
| i | 240 | 241 | 230 | 225 | 205 | 190 | 239 | 193 |
| j | 223 | 229 | 212 | 209 | 190 | 171 | 224 | 159 | a. Actual Examples
b. Comparison Examples
c. Kind of solution A
d. $W_a$ of elastomer is solution A (wt %)
e. Kind of solution B
f. $W_b$ of elastomer in solution B (wt %)
g. Tensile shear strength by non-mixed adhesion
h. Average value
i. Maximum value
j. Minimum value
k. Tensile shear strength by mixed adhesion From these results, it can be seen that when solutions A and B are used without mixing, those in which the ratio $W_a/W_b$ of the elastomer ingredient contents in solutions A and B is in the range 0.5–3.0 had comparatively small scattering of the adhesive strength, and when solutions A and B were mixed before use, their adhesive strengths are high and the scattering small whatever the ratios of the elastomer compositions of solutions A and B are.

Actual Examples 26–38

First, as shown in Table 6 below, solutions A and B were prepared such that the copolymer compositions had (meth)acrylate monomer parts with various glass transition temperatures. The secondary transition temperatures of the various compositions ($T_{gA}$, $T_{gB}$) were obtained by calculating according to the method described above. In this calculation, since the quantity of the di-(meth)acrylate monomer used is ordinarily small, it was ignored, and the secondary transition temperatures were obtained by assuming that the other ingredients of solutions A and B have no effects on the glass transition temperatures of the (meth)acrylate monomer copolymers.

TABLE 6

|   | a | | | | | | | | b | | | | | | | |
|---|---|---|---|---|---|---|---|---|---|---|---|---|---|---|---|---|
|   | A16 | A17 | A18 | A19 | A20 | A21 | A22 | A23 | B16 | B17 | B18 | B19 | B20 | B21 | B22 | B23 |
| a COMPOSITION | | | | | | | | | | | | | | | | |
| d NBR | 25 | 30 | 25 | 15 | 20 | 20 | 20 | 25 | — | — | — | — | — | — | — | — |
| e | — | — | — | 5 | — | — | — | — | — | 15 | 15 | — | — | — | — | 15 |
| e | — | — | — | — | — | 5 | — | — | 20 | — | — | — | 15 | 15 | — | — |
| f | — | — | — | — | 5 | — | — | — | — | — | — | 10 | — | — | 15 | — |
| g | 49 | 39 | 59 | 54 | 42 | 34 | 5 | 11 | 39 | 74 | 66 | 64 | 44 | 44 | 26 | 30 |
| h | — | — | — | 10 | 17 | — | 39 | — | — | — | 8 | 20 | — | — | 53 | — |
| i | — | — | — | — | — | 10 | 20 | 48 | — | — | — | — | 5 | 25 | — | 49 |
| j | 10 | — | — | — | — | — | — | — | 20 | — | — | — | — | — | — | — |
| k | — | — | — | — | — | — | — | — | — | — | — | — | — | 10 | — | — |
| l | — | 15 | — | — | — | — | — | — | 15 | — | — | — | — | — | — | — |
| m | — | — | — | — | 15 | — | — | — | — | — | — | — | 15 | — | — | — |
| n | 10 | 10 | 10 | 5 | 5 | — | 10 | 10 | — | — | — | — | — | — | — | — |
| o | — | — | — | 5 | 5 | 10 | — | — | — | 5 | 5 | — | 15 | — | — | — |
| p | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| q | 5 | 5 | 5 | 5 | 5 | 5 | 5 | 5 | 5 | — | — | — | — | — | — | — |
| r | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| s | 0.1 | 0.1 | 0.1 | 0.1 | 0.1 | 0.1 | 0.1 | 0.1 | — | — | — | — | — | — | — | — |
| t | — | — | — | — | — | — | — | — | 5 | 5 | 5 | 5 | 5 | 5 | 5 | 5 |
| u | — | — | — | — | — | — | — | — | 0.1 | 0.1 | 0.1 | 0.1 | 0.1 | 0.1 | 0.1 | 0.1 | a. Kind of solution A
b. Kind of solution B
c. Composition
d. Hypalon 20
e. Niporu
h. Butyl methacrylate
i. 2-ethylhexyl methacrylate
j. Isobornyl methacrylate
k. Acrylonitrile
l. Styrene
o. Hydroxyethyl methacrylate
p. Ethylene glycol dimethacrylate
q. Cumene hydroperoxide
r. 2,5-ti-butyl-hydroquinone
s. Cobalt naphthenate

| f. | Zettoporu | m. | Vinyl acetate | t. | Butylaldehyde aniline condensate Nokusera-8 |
| g. | Methyl methacrylate | n. | Methacrylic acid | u. | Oil blue |

Next, the various solutions A and B shown in Table 6 above were selected as shown in Table 7 below, and resins and sanded spec copper plates were each adhered to each other. The tensile shear strengths were compared in the case in which the solutions A and B were used without being mixed and the case in which they were used after being mixed, as in Actual Examples 20–25. The measurements were performed under the same conditions as in Actual Examples 20–25. These results are shown in Table 7 below.

Actual Examples 39–50 and Comparison Examples 14, 15

Solutions A and B shown in Tables 1 and 2 were selected according to Table 8 below, and adhesive compositions with different ratios of the total elastomer quantity to the quantity of chlorosulfonated polyethylene in the adhesive composition, when the solutions A and B were used in equal quantities, were prepared. The adhesives were used to adhere resins to each other and

TABLE 7

| | | | | | | a | | | | | | |
|---|---|---|---|---|---|---|---|---|---|---|---|---|
| | 26 | 27 | 28 | 29 | 30 | 31 | 32 | 33 | 34 | 35 | 36 | 37 | 38 |
| b | A20 | A17 | A21 | A22 | A18 | A18 | A19 | A16 | A23 | A18 | A22 | A23 | A16 |
| c (°C.) | 80.4 | 115.7 | 58.5 | 29.9 | 113.1 | 113.1 | 91.3 | 124.6 | 22.6 | 113.1 | 29.9 | 22.6 | 124.1 |
| d | B19 | B16 | B20 | B22 | B17 | B18 | B22 | B21 | B17 | B23 | B16 | B16 | B33 |
| e (°C.) | 80.4 | 122.7 | 69.2 | 41.4 | 101.4 | 90.8 | 41.4 | 61.3 | 101.4 | 23.9 | 122.7 | 122.7 | 23.9 |
| f (°C.) | 0.0 | 7.0 | 10.7 | 11.5 | 11.7 | 22.3 | 49.9 | 63.3 | 78.8 | 89.2 | 92.8 | 100.1 | 100.2 |
| g (kg/cm²) | | | | | | | | | | | | | |
| h | 164 | 211 | 137 | 65 | 218 | 196 | 131 | 166 | 105 | 77 | 72 | 63 | 69 |
| i | 171 | 229 | 159 | 89 | 238 | 216 | 160 | 181 | 125 | 126 | 127 | 120 | 119 |
| j | 152 | 197 | 115 | 44 | 197 | 170 | 89 | 95 | 73 | 39 | 43 | 35 | 34 |
| g (kg/cm²) | | | | | | | | | | | | | |
| h | 175 | 226 | 153 | 82 | 230 | 211 | 162 | 190 | 145 | 147 | 150 | 149 | 150 |
| i | 182 | 241 | 160 | 91 | 243 | 218 | 175 | 201 | 154 | 165 | 167 | 167 | 170 |
| j | 168 | 219 | 145 | 73 | 222 | 199 | 153 | 178 | 130 | 126 | 129 | 132 | 125 | a. Actual Example
b. Kind of solution A
c. Secondary transition temperature $T_{gA}$ of monomer composition copolymer in solution A
d. Kind of solution B
e. Secondary transition temperature $T_{gB}$ of monomer composition copolymer in solution B
f. Difference between $T_{gA}$ and $T_{gB}$
g. Tensile shear strength by non-mixed adhesion
h. Average value
i. Maximum value
j. Minimum value
k. Tensile shear strength by mixed adhesion From these results, it can be seen that when solutions A and B are used without mixing, the scattering of the adhesive strength is smaller, the smaller the difference is between the secondary transition temperatures $T_{gA}$ and $T_{gB}$ of the monomer composition copolymers of solutions A and B. When solutions A and B are mixed before use, the scatter of the adhesive strength is small regardless of the difference between $T_{gA}$ and $T_{gB}$.

sanded spec copper plates to each other. After standing at room temperature for 1 day, the tensile shear strengths of the adhesive bonds were measured. Furthermore, these adhered bodies were left for 2 months at 120° C., after which the temperature was returned to 20° C. and the tensile shear strengths were measured; their resistances to thermal deterioration were compared. Moreover, after letting the adhered bodies cure for 3 days at room temperature after adhesion, their impact strengths were measured. These results are shown in Table 8 below.

TABLE 8

| | Actual Examples | | | | | | | | | | | | b | |
|---|---|---|---|---|---|---|---|---|---|---|---|---|---|---|
| | 39 | 40 | 41 | 42 | 43 | 44 | 45 | 46 | 47 | 48 | 49 | 50 | 14 | 15 |
| c | A2 | A1 | A2 | A3 | A4 | A8 | A5 | A5 | A9 | A3 | A3 | A3 | * | |
| d (%) | 30 | 35 | 30 | 25 | 20 | 20 | 12.5 | 12.5 | 15 | 25 | 25 | 25 | 30 | |
| e (%) | 0 | 0 | 0 | 0 | 0 | 5 | 0 | 0 | 15 | 0 | 0 | 0 | 0 | |
| f | B7 | B5 | B4 | B9 | B2 | B3 | B2 | B1 | B2 | B13 | B14 | B15 | | |
| g (%) | 5 | 10 | 12.5 | 15 | 20 | 17.5 | 20 | 25 | 20 | 0 | 0 | 0 | 0 | |
| h (%) | 0 | 0 | 0 | 0 | 0 | 0 | 0 | 0 | 0 | 0 | 10 | 15 | | |
| $\frac{(Xa1 + Xb1 + Xb2) \times 100}{Xa}$ | 16.7 | 28.6 | 41.7 | 60 | 100 | 112.5 | 160 | 200 | 233.3 | 0 | 40 | 60 | 0 | |
| i    j | 210 | 203 | 200 | 178 | 165 | 178 | 143 | 96 | 87 | 206 | 77 | 192 | 238 | 196 |
|      120° C. k | 105 | 143 | 150 | 142 | 141 | 135 | 126 | 130 | 123 | 144 | 112 | 94 | 130 | 97 |
| l    j | 238 | 231 | 225 | 220 | 198 | 215 | 176 | 137 | 124 | 240 | 98 | 210 | — | — |
|      120° C. k | 142 | 196 | 216 | 229 | 217 | 221 | 207 | 193 | 138 | 185 | 120 | 113 | — | — |
| m (kg-cm/cm²) | 11 | 15 | 15 | 15 | 15 | 14 | 12 | 9 | 10 | 5 | 6 | 12 | 15 | 14 |

TABLE 8-continued

| | Actual Examples | | | | | | | | | | | | b | |
|---|---|---|---|---|---|---|---|---|---|---|---|---|---|---|
| | 39 | 40 | 41 | 42 | 43 | 44 | 45 | 46 | 47 | 48 | 49 | 50 | 14 | 15 |
| n (kg-cm/cm$^2$) | 14 | 17 | 16 | 17 | 17 | 16 | 14 | 12 | 13 | 8 | 7 | 14 | — | — | b. Comparison Examples
c. Kind of solution A
d. Chlorosulfonated polyethylene content $X_a$ in solution A
e. NBR content in $X_{a1}$ in solution A
f. Kind of solution in B
g. NBR content in $X_{b1}$ in solution B
h. Content $X_{b2}$ of other elastomer ingredient in solution B
i. Tensile shear strength with non-mixed adhesion
j. Initial period
k. After 2 months at 120° C.
l. Tensile shear strength with mixed adhesion
m. Impact strength when non-mixed adhesion was performed
n. Impact strength when mixed adhesion was performed
o. *non-mixed type used From these results, it can be seen that the combinations of solutions A and B in which the ratio of the total elastomer ingredient to the quantity of chlorosulfonated polyethylene was 28.5–160 wt. % had excellent adhesive strengths, resistances to thermal deterioration, and impact strengths, and that these properties were better with the mixed adhesion than with the non-mixed adhesion.

Actual Examples 51–64 and Comparison Examples 16–19

The thixo coefficients were obtained by measuring the empirical viscosity with two revolutions $\eta_2$ and the empirical viscosity with 20 revolutions $\eta_{20}$ at 20° C., using a type B viscometer, and taking their ratio $\eta_2/\eta_{20}$. The spinnability was obtained by pulling a glass rod from a container containing a solution A or B and checking the ease with which the thread of the adhesive was cut and the spinning time, etc.; those solutions which were easy to cut are shown as O, those which were somewhat difficult to cut as Δ, and those which could be pulled to a great degree as X.

TABLE 9

| | A24 | A25 | A26 | A27 | A28 | A29 | A30 | A31 | A32* | A33* |
|---|---|---|---|---|---|---|---|---|---|---|
| COMPOSITION | | | | | | | | | | |
| b | 25 | 25 | 20 | 15 | 12.5 | 25 | 8 | 20 | | |
| c | 5 | — | — | — | — | — | — | — | | |
| d | | | | | | | | | | |
| e | 1.5 | — | — | — | — | — | — | — | | |
| e | — | 2.5 | 2.5 | — | — | — | — | — | | |
| e | — | — | 7.5 | 21 | 25 | 1 | 20 | — | | |
| g | — | — | — | — | — | — | — | 10 | | |
| h | 49.5 | 58.5 | 56 | 50 | 48.5 | 60 | 58 | 56 | | |
| i | 5 | — | 5 | — | — | — | — | — | | |
| j | 10 | 5 | 5 | 10 | 10 | 10 | 10 | 10 | | |
| k | — | 5 | — | — | — | — | — | — | | |
| l | 2 | 2 | 2 | 2 | 2 | 2 | 2 | 2 | | |
| m | 0.5 | 0.5 | 0.5 | 0.5 | 0.5 | 0.5 | 0.5 | 0.5 | | |
| n | 1.5 | 1.5 | 1.5 | 1.5 | 1.5 | 1.5 | 1.5 | 1.5 | | |
| o | 5 | 10 | 50 | 140 | 200 | 4 | 250 | 0 | — | — |
| p | | | | | | | | | | |
| $\eta_2$ | 40000 | 15300 | 28000 | 106000 | 122000 | 22000 | 96000 | 23000 | 10600 | 5000 |
| $\eta_{20}$ | 25000 | 8500 | 10600 | 18000 | 20000 | 18200 | 15000 | 21000 | 9700 | 4500 |
| $\eta_2/\eta_{20}$ | 1.6 | 1.8 | 2.6 | 5.9 | 6.1 | 1.2 | 6.4 | 1.1 | 1.1 | 1.1 |
| q | O | O | O | O | O | Δ | O | X | X | X |

*Other company's product used, comparisons b. Hypalon
c. Niporu
d. Sytrene block copolymer
e. Jureiton
f. Correction July 28, 1989
g. Acrylic resin Pararoido A-30
h. Methyl methacrylate
i. Styrene
j. Methacrylic acid
k. Hydroxyethyl methacrylate
l. Ethylene glycol dimethacrylate
m. 2,5-tertiary-butyl-hydroquinone
n. Cumene hydroperoxide
o. Wt % of styrene block copolymer with respect to elastomer ingredient
p. Thixotropy
q. Spinnability First, solutions A and B were prepared as shown in Tables 9 and 10 below. The thixotropyl coefficients and spinnabilities of the various solutions were measured.

TABLE 10

| | B24 | B25 | B26 | B27 | B28 | B29 | B30 | B31 | B32 b | B33 b |
|---|---|---|---|---|---|---|---|---|---|---|
| COMPOSITION | | | | | | | | | | |
| NBR | | | | | | | | | | |
| c | 20 | 15 | — | — | 5 | 20 | 8 | 15 | | |
| c | — | — | 12 | — | 5 | — | — | — | | |
| d | — | — | — | 10 | — | — | — | — | | |
| e | | | | | | | | | | |
| f | 1 | — | — | — | — | 0.5 | — | — | | |
| f | — | 1.5 | — | — | — | — | — | — | | |

TABLE 10-continued

| | | | | | | | | | | |
|---|---|---|---|---|---|---|---|---|---|---|
| f | — | — | 6 | 14 | 20 | — | 24 | 0.5 | | |
| h | — | — | — | — | — | — | — | 14.5 | | |
| i | 64 | 66.5 | 72 | 66 | 60 | 69.5 | 58 | 60 | | |
| j | 5 | 7 | — | — | — | — | — | — | | |
| k | 2 | 2 | 2 | 2 | 2 | 2 | 2 | 2 | | |
| l | 0.2 | 0.2 | 0.2 | 0.2 | 0.2 | 0.2 | 0.2 | 0.2 | | |
| m | 0.2 | 0.2 | 0.2 | 0.2 | 0.2 | 0.2 | 0.2 | 0.2 | | |
| n | 7.5 | 7.5 | 7.5 | 7.5 | 7.5 | 7.5 | 7.5 | 7.5 | | |
| o | 0.1 | 0.1 | 0.1 | 0.1 | 0.1 | 0.1 | 0.1 | 0.1 | | |
| p | 5 | 10 | 50 | 140 | 200 | 25 | 300 | 3.3 | | |
| q | | | | | | | | | | |
| $\eta_2$ | 23100 | 7600 | 8750 | 33000 | 65000 | 11000 | 108000 | 17600 | 10800 | 3600 |
| $\eta_{20}$ | 13600 | 4000 | 3500 | 7500 | 12500 | 8300 | 18000 | 16000 | 9000 | 3300 |
| $\eta_2/\eta_{20}$ | 1.7 | 1.9 | 2.5 | 4.4 | 5.2 | 1.3 | 6.0 | 1.1 | 1.2 | 1.1 |
| r | ○ | ○ | ○ | ○ | X | ○ | X | X | X | X |

| | | | |
|---|---|---|---|
| b. | Other company's product | j. | Styrene |
| c. | Niporu | k. | Ethylene glycol dimethacrylate |
| d. | Zettoporu | l. | 2,5-tertiary-butyl-hydroquinone |
| e. | Styrene block copolymer | m. | Cobalt naphthenate |
| f. | Kureiton | n. | Accelerator 808 |
| h. | Acrylic resin Pararoido A-30 | o. | Oil red |
| i. | Methyl methacrylate | | |
| p. | Wt % of styrene block copolymer with respect to elastomer ingredient | | |
| q. | Thixotropy | | |
| r. | Spinnability | | |

Moreover, the spinnabilities of mixtures of the various solutions A shown in Table 9 and the solution B26 shown in Table 10, at a 1/1 weight ratio, mixed by hand for 30 seconds, and mixtures of the various solutions B shown in Table 10 and the solution A25 shown in Table 9, mixed by hand in the same way, were measured, and these results are shown in Tables 11 and 12.

In addition, using these mixtures of solutions A and B, resins were adhered to each other and sandblasted spec copper plates were adhered to each other; after curing for 1 day at room temperature, their tensile shear strengths were measured. These results are also shown in Tables 11 and 12 below.

TABLE 11

| | Actual Examples | | | | | | | | Comparisons | |
|---|---|---|---|---|---|---|---|---|---|---|
| | 51 | 52 | 53 | 54 | 55 | 56 | 57 | 58 | 16 | 17 |
| Solution A | A24 | A25 | A26 | A27 | A28 | A29 | A30 | A31 | A32 | A33 |
| Spinnability mixed w/B26 | ○ | ○ | ○ | ○ | ○ | △ | ○ | X | X | X |
| Adhesive Strength kg/cm² | 210 | 219 | 200 | 173 | 161 | 220 | 97 | 211 | 215 | 130 |

TABLE 12

| | Actual Examples | | | | | | | | Comparisons | |
|---|---|---|---|---|---|---|---|---|---|---|
| | 59 | 60 | 61 | 62 | 63 | 64 | 65 | 66 | 18 | 19 |
| Solution B | B24 | B25 | B26 | B27 | B28 | B29 | B30 | B31 | B32 | B33 |
| Spinnability mixed with/A25 | ○ | ○ | ○ | ○ | ○ | X | ○ | X | — | — |
| Adhesive Strength (kg/cm²) | 208 | 230 | 219 | 196 | 165 | 215 | 112 | 197 | 215 | 130 |

It is apparent that various changes and modifications may be made in the embodiments of the invention described above, without departing from the scope of the invention, as defined in the appended claims, and it is intended therefore, that all matter obtained in the foregoing description shall be interpreted as illustrative only and not as limitative of the invention.

I claim:

1. A two-solution acrylic adhesive composition, consisting of a solution A, in which the following ingredients (1)–(3) are dissolved and mixed as necessary ingredients, in the proportions mentioned below, and a solution B, in which the following ingredients (4)–(6) are dissolved and mixed as necessary ingredients, in the proportions mentioned below:

Solution A

| | |
|---|---|
| (1) Chlorosulfonated polyethylene | 12.5–35 wt % |
| (2) At least one (meth)acrylate selected from a group consisting of (meth)acrylic acid, (meth)acrylate, di(meth)acrylate, and (meth)acrylate with hydroxyl, glycidyl, or amino groups | 50–85 wt % |
| (3) Organic peroxide | 0.2–10 wt % |

Solution B

| | |
|---|---|
| (4) Butadiene-acrylonitrile copolymer elastomer | 10–25 wt % |
| (5) At least one (meth)acrylate selected from a group consisting of (meth)acrylic acid, (meth)acrylate, di(meth)acrylate, and (meth)acrylate with hydroxyl, glycidyl, or amino groups | 40–90 wt % |
| (6) Curing accelerator consisting of an amine-aldehyde condensate | 1–20 wt % |

2. A two-solution acrylic adhesive composition in accordance with claim 1, in which a butadiene-acrylonitrile copolymer elastomer is contained in the aforementioned solution A, and the proportions of the elastomer content in solution A (Wa) and the elastomer content in solution B(Wb) are such that $W_a/W_b=0.5$–3.0, by weight.

3. A two-solution acrylic adhesive composition in accordance with claim 1 in which at least one of the aforementioned solutions A or B contains at least one styrene block copolymer, selected from a group including styrene-butadiene-styrene block copolymers, styrene-isoprene-styrene block copolymers, styrene-ethylene-butylene-styrene block copolymers, styrene-butadiene block copolymers, styrene-isoprene block copolymers, styrene-ethylene-butylene block copolymers and styrene-ethylene-propylene block copolymers.

4. A two-solution acrylic adhesive composition in accordance with claim 3 in which the aforementioned styrene block copolymer has the proportion of 5–200 wt. % with respect to the elastomer ingredient contained in the solution A or B which contains the styrene block copolymer.

5. A two-solution acrylic adhesive composition in accordance with claim 1 in which the butadiene-acrylonitrile copolymer elastomer is a hydrogenated nitrile rubber.

* * * * *